(12) United States Patent
Deng et al.

(10) Patent No.: US 9,497,718 B2
(45) Date of Patent: Nov. 15, 2016

(54) METHOD, APPARATUS AND SYSTEM FOR SYNCHRONIZATION BETWEEN BASE STATIONS

(71) Applicant: HUAWEI TECHNOLOGIES CO., LTD., Shenzhen (CN)

(72) Inventors: Tianle Deng, Shanghai (CN); Binsong Tang, Shanghai (CN); Haiyan Luo, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 137 days.

(21) Appl. No.: 13/909,550

(22) Filed: Jun. 4, 2013

(65) Prior Publication Data
US 2013/0265992 A1 Oct. 10, 2013

Related U.S. Application Data

(63) Continuation of application No. PCT/CN2011/083597, filed on Dec. 7, 2011.

(30) Foreign Application Priority Data

Dec. 10, 2010 (CN) .......................... 2010 1 0595913

(51) Int. Cl.
*H04W 56/00* (2009.01)

(52) U.S. Cl.
CPC ................................. *H04W 56/001* (2013.01)

(58) Field of Classification Search
None
See application file for complete search history.

(56) References Cited

U.S. PATENT DOCUMENTS 6,526,039 B1 * 2/2003 Dahlman et al. ............. 370/350

| | | | |
|---|---|---|---|
| 2007/0291668 A1 | 12/2007 | Duan | |
| 2008/0285627 A1 | 11/2008 | Bruas | |
| 2008/0299972 A1 | 12/2008 | Weese | |

(Continued)

FOREIGN PATENT DOCUMENTS

| | | |
|---|---|---|
| CN | 1476183 A | 2/2004 |
| CN | 101316136 A | 12/2008 |

(Continued)

OTHER PUBLICATIONS

PCT International Search Report and Written Opinion of the International Searching Authority mailed Mar. 15, 2012 in corresponding International Application No. PCT/CN2011/083597.

(Continued)

*Primary Examiner* — Jason Mattis
*Assistant Examiner* — James P Duffy
(74) *Attorney, Agent, or Firm* — Staas & Halsey LLP

(57) ABSTRACT

The present invention provides a method, an apparatus, and a system for synchronization between base stations. The method for synchronization between base stations includes: A first base station receives synchronization information sent by a user equipment, where the first base station is a serving base station of the user equipment; and the first base station adjusts a downlink sending time point and an uplink receiving time point of the first base station according to the synchronization information, so as to keep consistency between the downlink sending time point of the first base station and a downlink sending time point of a second base station that serves as a synchronization time reference and keep consistency between the uplink receiving time point of the first base station and an uplink receiving time point of the second base station.

14 Claims, 7 Drawing Sheets

(56) References Cited

U.S. PATENT DOCUMENTS

| | | |
|---|---|---|
| 2009/0097452 A1 | 4/2009 | Gogic |
| 2009/0103499 A1* | 4/2009 | Hofmann et al. ............ 370/336 |
| 2009/0310522 A1 | 12/2009 | Bertonis et al. |
| 2010/0035641 A1 | 2/2010 | Kobayashi et al. |
| 2010/0054237 A1* | 3/2010 | Han ...................... H04J 3/0638 370/350 |
| 2010/0111070 A1 | 5/2010 | Hsu |
| 2010/0157906 A1* | 6/2010 | Yang et al. ................... 370/328 |
| 2010/0208720 A1 | 8/2010 | Fujishima et al. |
| 2010/0215032 A1* | 8/2010 | Jalloul et al. ................. 370/350 |
| 2010/0222068 A1 | 9/2010 | Gaal et al. |
| 2010/0226358 A1 | 9/2010 | Cordeiro |

FOREIGN PATENT DOCUMENTS

| | | |
|---|---|---|
| CN | 101384019 A | 3/2009 |
| EP | 1804540 A1 | 7/2007 |
| JP | 2010-41537 | 2/2010 |

OTHER PUBLICATIONS

Extended European Search Report mailed Sep. 19, 2013 in corresponding European Application No. 11847110.1.
Japanese Office Action mailed Jul. 29, 2014 in corresponding Japanese Patent Application No. 2013-542361.
International Search Report mailed Mar. 15, 2012 corresponding to International Application No. PCT/CN2011/083597.

* cited by examiner

METHOD, APPARATUS AND SYSTEM FOR SYNCHRONIZATION BETWEEN BASE STATIONS

CROSS-REFERENCE TO RELATED APPLICATIONS

This application is a continuation of International Application No. PCT/CN2011/083597, filed on Dec. 7, 2011, which claims priority to Chinese Patent Application No. 201010595913.4, filed on Dec. 10, 2010, both of which are hereby incorporated by reference in their entireties.

TECHNICAL FIELD

The present invention relates to the field of wireless communications technologies, and in particular, to a technology for synchronization between base stations.

BACKGROUND

With the development of wireless network technologies, different wireless networks emerge, such as macro cell (Macro cell), pico cell (Pico cell), femto cell (Femto cell). Each cell can serve a certain area where a user equipment (User Equipment, UE) is located. Each base station can manage a plurality of cells. Transmit power and coverage of different base stations are different. Where, for a high-power base station (such as a macro base station), transmit power is relatively high and coverage is relatively large, for example, generally, transmit power of a macro base station is tens of watts and a coverage radius is 500~1000 m; and for a low-power base station (such as a Femto base station or a Pico base station), transmit power is relatively low and coverage is relatively small, for example, generally, a coverage radius of a Femto base station is about 10 m. A base station communicates with a UE through a downlink and an uplink, where a one-way communication link from the base station to the UE is referred to as a downlink, and a one-way communication link from the UE to the base station is referred to as an uplink.

On a heterogeneous network including a plurality of wireless networks, for the same electromagnetic wave resource, cells of different wireless networks may interfere with each other, which consequently deteriorates signal quality of cells that interferes with each other. To prevent and coordinate cell interference, transmission synchronization between interfering cells must be implemented at first, and further interference can be avoided through upper-layer resource scheduling. For a network by using an orthogonal frequency division multiple (Orthogonal Frequency Division Multiple, OFDM) transmission technology, a requirement for transmission synchronization is relatively strict. It is required that a transmission synchronization error is within one cycle prefix (Cycle Prefix, CP).

In the prior art, synchronization between base stations is mainly used to solve a problem of synchronization between a low-power base station that needs to adjust synchronization time and a high-power base station that serves as a synchronization time reference. Its main concept is to take the low-power base station that needs to adjust synchronization time and its coverage as a point for processing. Therefore, an applicable range of this method is limited. This method can apply only to synchronization between a low-power base station that needs to adjust synchronization time and a high-power base station that serves as a synchronization time reference, and cannot apply to other base station synchronization scenarios.

SUMMARY

Embodiments of the present invention provide a method, an apparatus, and a system for synchronization between base stations, which is used to solve a problem of a limited applicable range of a base station synchronization technology in the prior art, and expand the applicable range.

In one aspect, the present invention provides a method for synchronization between base stations, which includes: receiving, by a first base station, synchronization information sent by a user equipment, where the first base station is a serving base station of the user equipment; and adjusting, by the first base station, a downlink sending time point and an uplink receiving time point of the first base station according to the synchronization information, so as to keep consistency between the downlink sending time point of the first base station and a downlink sending time point of a second base station that serves as a synchronization time reference and keep consistency between the uplink receiving time point of the first base station and an uplink receiving time point of the second base station.

In another aspect, the present invention provides a method for synchronization between base stations, which includes: obtaining, by a user equipment, synchronization information; and sending, by the user equipment, the synchronization information to a first base station, where the first base station is a serving base station of the user equipment and the synchronization information is used for the first base station to adjust a downlink sending time point and an uplink receiving time point of the first base station, so as to keep consistency between the downlink sending time point of the first base station and a downlink sending time point of a second base station that serves as a synchronization time reference and keep consistency between the uplink receiving time point of the first base station and an uplink receiving time point of the second base station.

In still another aspect, the present invention provides a base station, and the base station serves as a first base station and is a serving base station of a user equipment, where the first base station includes: a receiving unit, configured to receive synchronization information sent by the user equipment; and an adjusting unit, configured to adjust a downlink sending time point and an uplink receiving time point of the first base station according to the synchronization information, so as to keep consistency between the downlink sending time point of the first base station and a downlink sending time point of a second base station that serves as a time synchronization reference and keep consistency between the uplink receiving time point of the first base station and an uplink receiving time point of the second base station.

In still another aspect, the present invention further provides a user equipment, which includes: an obtaining unit, configured to obtain synchronization information; and a sending unit, configured to send the synchronization information to a serving base station of the user equipment, where the synchronization information is used for the serving base station to adjust a downlink sending time point and an uplink receiving time point of the serving base station, so as to keep consistency between the downlink sending time point of the serving base station and a downlink sending time point of a second base station that serves as a synchronization time reference and keep consistency between the uplink receiving time point of the serving base station and an uplink receiving time point of the second base station.

In still another aspect, the present invention further provides a communication system, which includes the base station and the user equipment described in the foregoing.

In the foregoing technical solutions, a base station that needs to adjust synchronization time adjusts a downlink sending time point and an uplink receiving time point of the base station according to synchronization information reported by a user equipment served by the base station, so as to keep consistency between the downlink sending time point of the base station that needs to adjust synchronization time and a downlink sending time point of a base station that serves as a synchronization time reference and keep consistency between the uplink receiving time point of the base station that needs to adjust synchronization time and an uplink receiving time point of the base station that serves as a synchronization time reference, thereby implementing synchronization between base stations. In the foregoing technical solutions for synchronization between base stations, it does not need to assume coverage of the base station that needs to adjust synchronization time as a point. Therefore, an applicable range is large and is not limited to synchronization between a low-power base station that needs to adjust synchronization time and a high-power base station that serves as a synchronization time reference.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
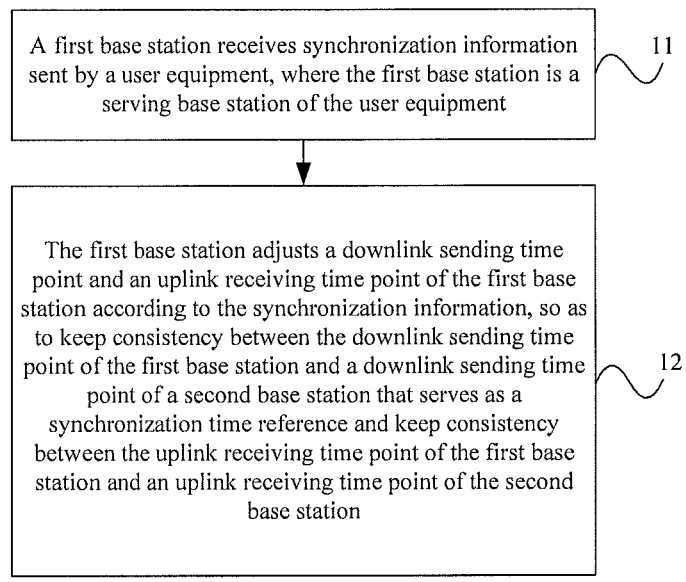
FIG. 1 is a schematic flow chart of a method for synchronization between base stations according to an embodiment of the present invention.

FIG. 1 is a schematic flow chart of a method for synchronization between base stations according to an embodiment of the present invention, where the method includes the following contents.

11: A first base station receives synchronization information sent by a user equipment, where the first base station is a serving base station of the user equipment.

12: The first base station adjusts a downlink sending time point and an uplink receiving time point of the first base station according to the synchronization information, so as to keep consistency between the downlink sending time point of the first base station and a downlink sending time point of a second base station that serves as a synchronization time reference and keep consistency between the uplink receiving time point of the first base station and an uplink receiving time point of the second base station.

In this embodiment, a first base station adjusts a downlink sending time point and an uplink receiving time point of the first base station according to synchronization information reported by a user equipment served by the first base station, so as to keep consistency between the downlink sending time point of the first base station and a downlink sending time point of a second base station that serves as a synchronization time reference and keep consistency between the uplink receiving time point of the first base station and an uplink receiving time point of the second base station that serves as a synchronization time reference, thereby achieving synchronization between the first base station and the second base station. In the foregoing technical solution for synchronization between base stations, it does not need to assume coverage of the base station (that is the first base station) that needs to adjust synchronization time as a point. Therefore, an applicable range is large and is not limited to synchronization between a low-power base station that needs to adjust synchronization time and a high-power base station that serves as a synchronization time reference.

Optionally, the synchronization information includes the downlink sending time point and/or the uplink receiving time point of the second base station. When the downlink sending time point and the uplink receiving time point of the second base station are different and the synchronization information includes the downlink sending time point and the uplink receiving time point of the second base station, the first base station adjusts, according to the downlink sending time point of the second base station, the downlink sending time point of the first base station to be consistent with the downlink sending time point of the second base station; and adjusts, according to the uplink receiving time point of the second base station, the uplink receiving time point of the first base station to be consistent with the uplink receiving time point of the second base station. Alternatively, when the downlink sending time point and the uplink receiving time point of the second base station are the same and the synchronization information includes the downlink sending time point or the uplink receiving time point of the second base station, the first base station adjusts, according to the downlink sending time point or the uplink receiving time point of the second base station, the downlink sending time point and the uplink receiving time point of the first base station to be consistent with the downlink sending time point or the uplink receiving time point of the second base station.

Optionally, the synchronization information includes a time difference between the downlink sending time point of the first base station and the downlink sending time point of the second base station, and/or a time difference between the uplink receiving time point of the first base station and the uplink receiving time point of the second base station. When the synchronization information includes the time difference between the downlink sending time point of the first base station and the downlink sending time point of the second base station and the time difference between the uplink receiving time point of the first base station and the uplink receiving time point of the second base station, the first base station adjusts, according to the time difference between the downlink sending time point of the first base station and the downlink sending time point of the second base station, the downlink sending time point of the first base station to be consistent with the downlink sending time point of the second base station; and adjusts, according to the time difference between the uplink receiving time point of the first base station and the uplink receiving time point of the second base station, the uplink receiving time point of the first base station to be consistent with the uplink receiving time point of the second base station. Alternatively, when the downlink sending time point and the uplink receiving time point of the second base station are the same and the synchronization information includes the time difference between the downlink sending time point of the first base station and the downlink sending time point of the second base station or the time difference between the uplink receiving time point of the first base station and the uplink receiving time point of the second base station, according to the time difference between the downlink sending time point of the first base station and the downlink sending time point of the second base station or the time difference between the uplink receiving time point of the first base station and the uplink receiving time point of the second base station, the first base station adjusts the downlink sending time point of the first base station to be consistent with the downlink sending time point of the second base station and adjusts the uplink receiving time point of the first base station to be consistent with the uplink receiving time point of the second base station.

Optionally, before the first base station receives the synchronization information sent by the user equipment, the method further includes: The first base station sends an instruction message to the user equipment, where the instruction message is used to instruct the user equipment to report the synchronization information after receiving the instruction message; or, the instruction message carries a period value, and the instruction message is used to instruct the user equipment to periodically report the synchronization information according to the period value.

Figure 2:
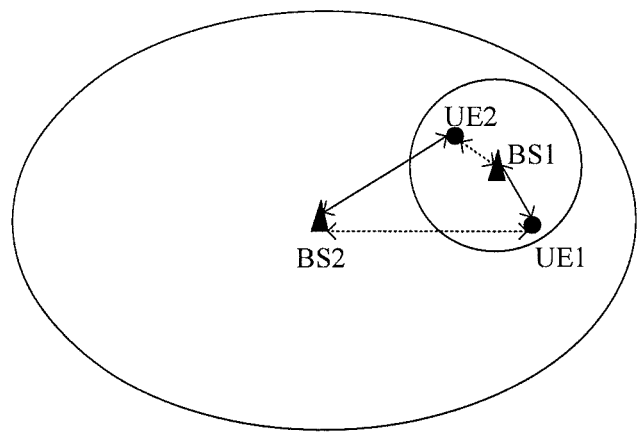
FIG. 2 is a schematic structural diagram of a system in a first scenario applicable to an embodiment of the present invention.
Figure 3:
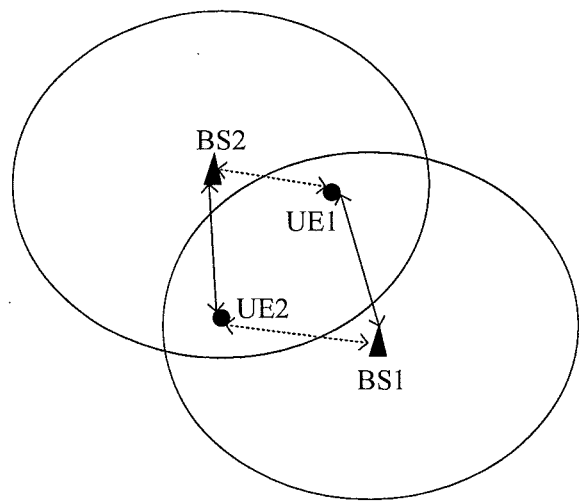
FIG. 3 is a schematic structural diagram of a system in a second scenario applicable to an embodiment of the present invention.

In the embodiments of the present invention, a base station that needs to adjust synchronization time is not limited to a low-power base station, and may apply to a scenario shown in FIG. 2 or FIG. 3.

FIG. 2 is a schematic structural diagram of a system in a first scenario applicable to an embodiment of the present invention. Referring to FIG. 2, this embodiment may apply to: a base station that serves as a synchronization time reference is a high-power base station (BS2), for example, a macro base station; and a base station that needs to adjust synchronization time is a low-power base station (BS1), for example, a Pico base station or a Femto base station. The BS2 is a serving base station of a UE2, and the BS1 is a serving base station of a UE1. Coverage of the low-power base station is within coverage of the high-power base station, and the UE2 is within coverage of the BS1 and also within coverage of the BS2. As shown in FIG. 2, a solid line indicates a communication link, and a dashed line indicates an interfering link.

FIG. 3 is a schematic structural diagram of a system in a second scenario applicable to an embodiment of the present invention. Referring to FIG. 3, this embodiment may apply to: a scenario in which a base station that serves as a synchronization time reference is a high-power base station (BS2), for example, a macro base station; and a base station that needs to adjust synchronization time is a high-power base station (BS1), for example, a macro base station. The BS2 is a serving base station of a UE2, and the BS1 is a serving base station of a UE1. There is an overlapped area between coverage of the two base stations, and the UE1 and the UE2 are located in the overlapped area. As shown in FIG. 3, a solid line indicates a communication link, and a dashed line indicates an interfering link.

In the foregoing two scenarios, the BS1 is a base station that needs to adjust synchronization time, and the BS2 is a base station that serves as a synchronization time reference; the BS1 is a serving base station of the UE1, and the BS2 is a serving base station of the UE2; In a downlink direction, the UE1 receives a downlink frame from the BS1 and a downlink frame from the BS2; and in an uplink direction, the BS1 receives an uplink frame from the UE1 and an uplink frame from the UE2. The following describes the downlink direction and the uplink direction separately, so as to describe an implementation process of the present invention.

Figure 4:
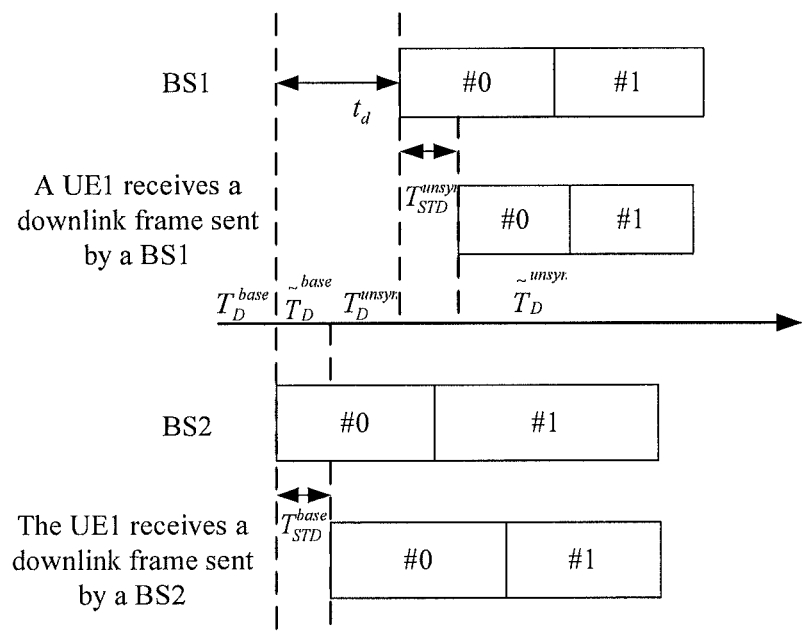
FIG. 4 is a time schematic diagram of downlink transmission according to an embodiment of the present invention.

FIG. 4 is a time schematic diagram of downlink transmission according to an embodiment of the present invention. Referring to FIG. 4, meanings of adopted parameters are as follows:

$T_D^{base}$: downlink sending time point of a BS2 relative to a UE2, that is, a time point at which the BS2 sends a downlink frame to the UE2;

$T_{STD}^{base}$: propagation delay between a UE1 and the BS2;

$t_d$: time difference between a downlink sending time point of a BS1 and the downlink sending time point of the BS2;

$T_D^{unsyn}$: downlink sending time point of the BS1 relative to the UE1;

$T_{STD}^{unsyn}$: propagation delay between the UE1 and the BS1;

$\tilde{T}_D^{base}$: time point at which the UE1 receives a downlink frame sent by the BS2;

$\tilde{T}_D^{unsyn}$: time point at which the UE1 receives a downlink frame sent by the BS1;

$\tilde{t}_d$: time difference between time when the UE1 receives a downlink frame sent by the BS1 and time when the UE1 receives a downlink frame sent by the BS2.

By taking a long term evolution (Long Term Evolution, LTE) system as an example, the length of a common CP is: $144 \times T_s \approx 4.7$ μs, where $T_s = 1/30720000$ is the length of a basic time unit. To avoid interference, it is required that a time difference for transmission synchronization is within the range of one CP.

If time synchronization is not considered, the BS1 may transmit a downlink frame at any time. Therefore, in most cases, a value of $\tilde{t}_d$ is greater than the length of one CP, which does not meet a requirement for transmission synchronization.

In a worst case, the UE1 is close to the BS2, but far away from the BS1, and in such a case, $\tilde{t}_d = T_{STD}^{unsyn} + t_d$. Therefore, by adjusting the downlink sending time point $T_D^{unsyn}$ of the BS1, $\tilde{t}_d = T_{STD}^{syn} + t_d$ in the foregoing may meet the requirement for transmission synchronization, for example, $\tilde{t}_d = T_{STD}^{unsyn} + t_d \leq$ length of CP.

Specially, if the downlink sending time point of the BS1 is adjusted to be consistent with the downlink sending time point of the BS2, that is $t_d = 0$, in a worst case, $\tilde{t}_d = T_{STD}^{unsyn}$; and for example, for a macro base station whose coverage is 1000 m, a propagation delay between the base station and a UE is $T_{STD}^{max} = 1000/(3.0 \times 10^8) \approx 3.33$ μs. Based on the foregoing calculation, the length of one CP is about 4.7 μs. Because a maximum propagation delay is 3.33 μs, if the downlink sending time point of the BS1 is adjusted to be consistent with the downlink sending time point of the BS2, the requirement for transmission synchronization may be met.

Figure 5:
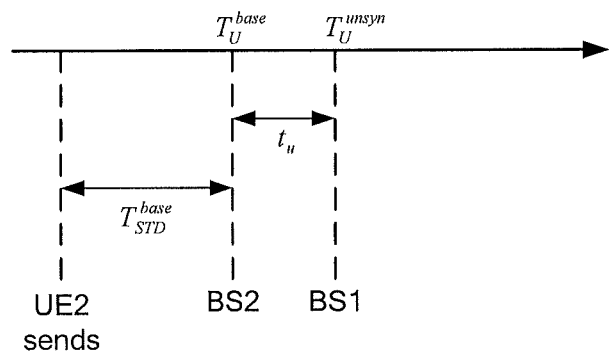
FIG. 5 is a time schematic diagram of uplink transmission according to an embodiment of the present invention.

FIG. 5 is a time schematic diagram of uplink transmission according to an embodiment of the present invention. Referring to FIG. 5, meanings of adopted parameters are as follows:

$T_U^{base}$: uplink receiving time point of a BS2 relative to a UE2, that is, a time point at which the BS2 receives an uplink frame sent by the UE2;

$T_{STD}^{base}$: propagation delay between the UE2 and the BS2;

$t_u$: time difference between an uplink receiving time point of a BS1 and the uplink receiving time point of the BS2;

$T_U^{unsyn}$: uplink receiving time point of the BS1 relative to a UE1;

$\tilde{t}_u$: time difference between time when the BS1 receives an uplink frame sent by the UE1 and time when the BS1 receives an uplink frame sent by the UE2.

In a worst case, the UE2 is close to the BS1, and in such a case, $\tilde{t}_u = T_{STD}^{base} + t_u$. Therefore, by adjusting the uplink receiving time point $T_U^{unsyn}$ of the BS1, $\tilde{t}_u = T_{STD}^{base} + t_u$ in the foregoing may meet a requirement for transmission synchronization, for example, $\tilde{t}_u = T_{STD}^{base} + t_u \leq$ length of CP.

Specially, if the uplink receiving time point of the BS1 is adjusted to be consistent with the uplink receiving time point of the BS2, that is $t_u = 0$, in a worst case, $\tilde{t}_u = T_{STD}^{base}$; and for example, for a macro base station whose coverage is 1000 m, a propagation delay between the base station and a UE is $T_{STD}^{max} = 1000/(3.0 \times 10^8) \approx 3.33$ μs. Based on the foregoing calculation, the length of one CP is about 4.7 μs. Because a maximum propagation delay is 3.33 μs, if the uplink receiving time point of the BS1 is adjusted to be consistent with the uplink receiving time point of the BS2, the requirement for transmission synchronization may be met.

It can be known from the foregoing analysis that, if an uplink receiving time point of a base station that needs to adjust synchronization time is adjusted to be consistent with an uplink receiving time point of a base station that serves as a synchronization time reference, and a downlink sending time point of the base station that needs to adjust synchronization time is adjusted to be consistent with a downlink sending time point of the base station that serves as a synchronization time reference, a requirement for transmission synchronization may be met.

Figure 6:
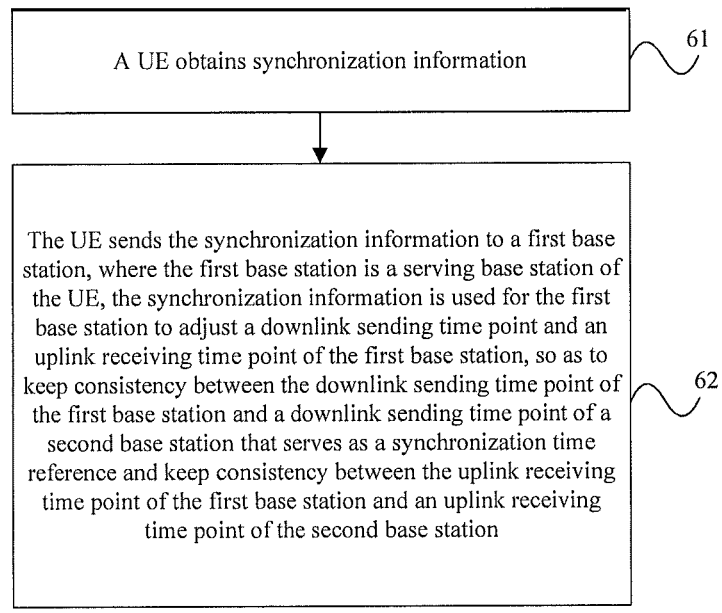
FIG. 6 is a schematic flow chart of a method for synchronization between base stations according to another embodiment of the present invention.

FIG. 6 is a schematic flow chart of a method for synchronization between base stations according to another embodiment of the present invention, where the method includes the following contents.

61: A UE obtains synchronization information.

62: The UE sends the synchronization information to a first base station, where the first base station is a serving base station of the UE, the synchronization information is used for the first base station to adjust a downlink sending time point and an uplink receiving time point of the first base station, so as to keep consistency between the downlink sending time point of the first base station and a downlink sending time point of a second base station that serves as a synchronization time reference and keep consistency between the uplink receiving time point of the first base station and an uplink receiving time point of the second base station.

In this embodiment, a first base station adjusts a downlink sending time point and an uplink receiving time point of the first base station according to synchronization information reported by a user equipment served by the first base station, so as to keep consistency between the downlink sending time point of the first base station and a downlink sending time point of a second base station that serves as a synchronization time reference and keep consistency between the uplink receiving time point of the first base station and an uplink receiving time point of the second base station that serves as a synchronization time reference, thereby achieving synchronization between the first base station and the second base station. In the foregoing technical solution for synchronization between base stations, it does not need to assume coverage of the base station (that is the first base station) that needs to adjust synchronization time as a point. Therefore, an applicable range is large and is not limited to synchronization between a low-power base station that needs to adjust synchronization time and a high-power base station that serves as a synchronization time reference.

Optionally, the user equipment obtains the synchronization information, which includes: The user equipment obtains the downlink sending time point and/or the uplink receiving time point of the second base station. Specifically, the user equipment obtains the downlink sending time point of the second base station according to a time point at which the user equipment receives a downlink frame sent by the second base station and a propagation delay between the user equipment and the second base station. The user equipment obtains the uplink receiving time point of the second base station according to a time point at which the user equipment sends an uplink frame to the second base station and the propagation delay between the user equipment and the second base station.

Optionally, the user equipment obtains the synchronization information, which includes: The user equipment obtains a time difference between the downlink sending time point of the first base station and the downlink sending time point of the second base station, and/or a time difference between the uplink receiving time point of the first base station and the uplink receiving time point of the second base station. Specifically, the user equipment obtains the downlink sending time point of the first base station according to a time point at which the user equipment receives a downlink frame sent by the first base station and a propagation delay between the user equipment and the first base station; the user equipment obtains the downlink sending time point of the second base station according to a time point at which the user equipment receives a downlink frame sent by the second base station and a propagation delay between the user equipment and the second base station; and the user equipment obtains the time difference between the downlink sending time point of the first base station and the downlink sending time point of the second base station according to the downlink sending time point of the first base station and the downlink sending time point of the second base station.

The user equipment obtains the uplink receiving time point of the first base station according to a time point at which the user equipment sends an uplink frame to the first base station and the propagation delay between the user equipment and the first base station; the user equipment obtains the uplink receiving time point of the second base station according to a time point at which the user equipment sends an uplink frame to the second base station and the propagation delay between the user equipment and the second base station; and the user equipment obtains the time difference between the uplink receiving time point of the first base station and the uplink receiving time point of the second base station according to the uplink receiving time point of the first base station and the uplink receiving time point of the second base station.

Optionally, before the user equipment obtains the synchronization information, the method further includes: Receive an instruction message sent by the first base station, where the instruction message is used to instruct the user equipment to send the synchronization information after receiving the instruction message; or, the instruction message carries a period value, and the instruction message is used to instruct the user equipment to periodically send the synchronization information according to the period value.

In the following embodiment, that a base station triggers a UE to report synchronization information is taken as an example. In the following embodiment, a first base station is a base station that needs to adjust synchronization time and the first base station is a serving base station of a UE; and a second base station is a base station that serves as a synchronization time reference.

Figure 7:
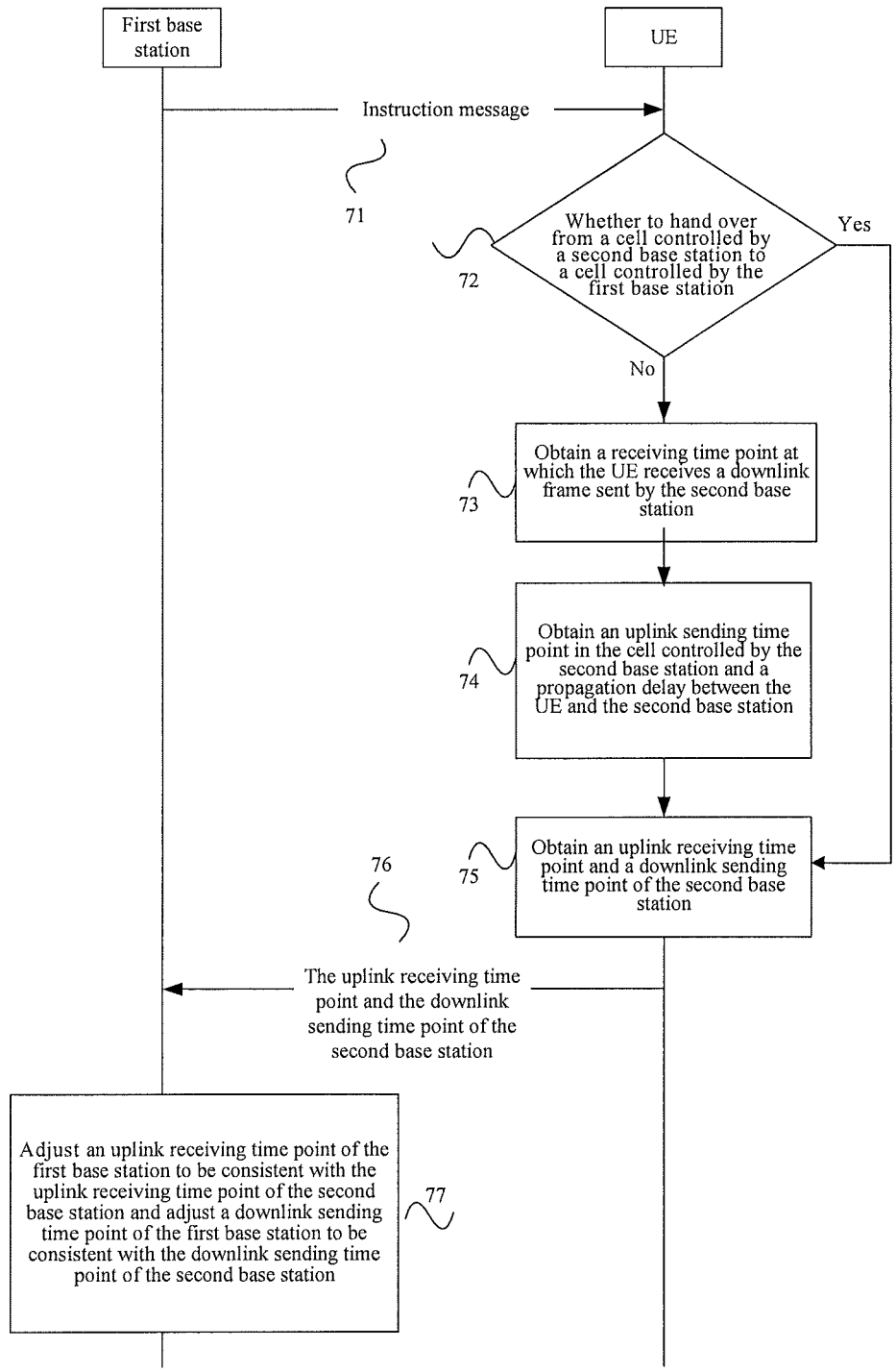
FIG. 7 is a schematic flow chart of a method for synchronization between base stations according to another embodiment of the present invention.

FIG. 7 is a schematic flow chart of a method for synchronization between base stations according to another embodiment of the present invention. In this embodiment, synchronization information including a downlink sending time point and an uplink receiving time point of a second base station that serves as a synchronization time reference is taken as an example. Referring to FIG. 7, this embodiment includes the following contents.

71: A first base station sends an instruction message to a UE, to trigger the UE to perform synchronization information measurement.

72: The UE determines whether to hand over from a cell controlled by a second base station to a cell controlled by the first base station. If yes, directly perform 75; otherwise, perform 73.

For example, when receiving an instruction message sent by the first base station, the UE is located in a cell controlled by the first base station, and the UE may store historical information; and the UE may determine, according to the stored historical information, whether to hand over from a cell controlled by the second base station to the cell controlled by the first base station.

73: The UE measures a synchronous signal in the cell controlled by the second base station, and obtains a receiving time point $\tilde{T}_D^{base}$ at which the UE receives a downlink frame sent by the second base station.

74: The UE starts a physical random access channel (Physical Random Access Channel, PRACH) process in the cell controlled by the second base station, and obtains an uplink sending time point $T_a^{base}$ in the cell controlled by the second base station and a propagation delay $T_{STD}^{base}$ between the UE and the second base station.

75: The UE obtains an uplink receiving time point $T_U^{base}$ and a downlink sending time point $T_D^{base}$ of the second base station.

In a specific implementation process, if the UE hands over from the cell controlled by the second base station to the cell controlled by the first base station, the UE may obtain the uplink receiving time point and the downlink sending time point of the second base station from the historical information directly. If the UE does not hand over from the cell controlled by the second base station to the cell controlled by the first base station, the UE may obtain the uplink receiving time point $T_U^{base}$ and the downlink sending time point $T_D^{base}$ of the second base station through calculation according to parameters obtained in 73 and 74, for example, the calculation is performed according to the following formulas: $T_U^{base}=T_a^{base}+T_{STD}^{base}$; and $T_D^{base}=\tilde{T}_D^{base}-T_{STD}^{base}$.

76: The UE sends the uplink receiving time point and the downlink sending time point of the second base station to the first base station, where the UE may send the synchronization information (specifically, the uplink receiving time point and the downlink sending time point of the second base station), in an event-triggering manner or in a periodic-triggering manner, that is, it may be that after the UE obtains the synchronization information by being triggered by the instruction message, the UE reports the synchronization information to the first base station; and it may also be that the instruction message carries a period value, the UE periodically reports the synchronization information according to the period value, for example, the period value is x, the UE reports the synchronization information with x as a period.

77: The first base station receives the uplink receiving time point and the downlink sending time point of the second base station that are sent by the UE, adjusts an uplink receiving time point of the first base station to be consistent with the uplink receiving time point of the second base station, and adjusts a downlink sending time point of the first base station to be consistent with the downlink sending time point of the second base station. That is: the uplink receiving time point of the first base station after adjustment=$T_U^{base}$; and the downlink sending time point of the first base station after adjustment=$T_D^{base}$.

In this embodiment, a base station that needs to adjust synchronization time adjusts a downlink sending time point and an uplink receiving time point of the base station according to a downlink sending time point and an uplink receiving time point of a base station that serves as a synchronization time reference, where the downlink sending time point and the uplink receiving time point are reported by a UE served by the base station that needs to adjust synchronization time, so as to keep consistency between time points after the adjustment and the downlink sending time point and the uplink receiving time point of the base station that serves as a synchronization time reference, thereby achieving synchronization between the base stations. Furthermore, in this embodiment, it does not need to assume coverage of the base station that needs to adjust synchronization time as a point. Therefore, an applicable range is large and is not limited to synchronization between a low-power base station that needs to adjust synchronization time and a high-power base station that serves as a synchronization time reference. Further, this embodiment, by using the downlink sending time point and the uplink receiving time point of the base station that serves as a synchronization time reference, may apply to a scenario in which a downlink sending time point is inconsistent with an uplink receiving time point.

Figure 8:
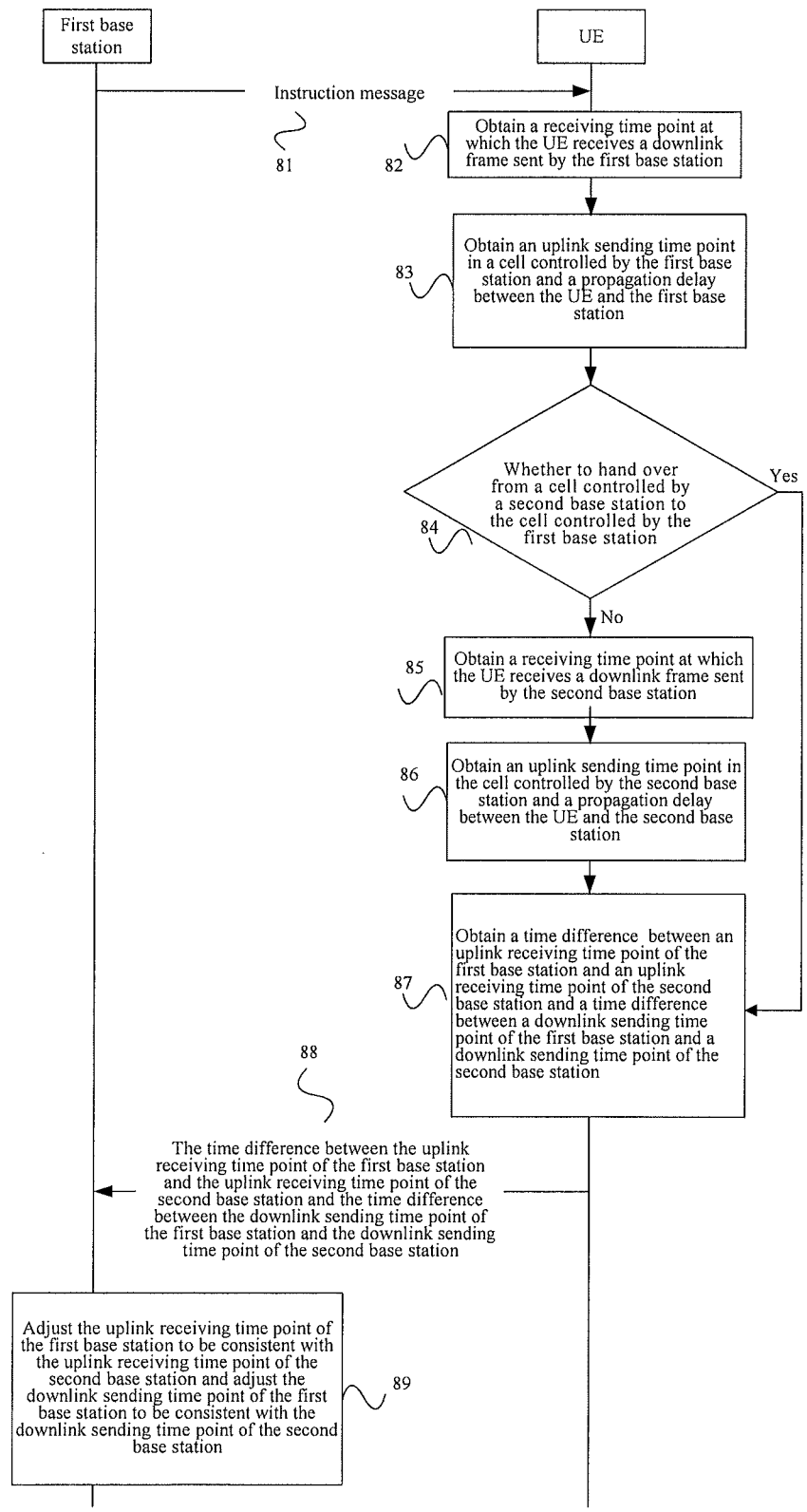
FIG. 8 is a schematic flow chart of a method for synchronization between base stations according to another embodiment of the present invention.

FIG. 8 is a schematic flow chart of a method for synchronization between base stations according to another embodiment of the present invention. In this embodiment, synchronization information including a time difference between a downlink sending time point of a first base station and a downlink sending time point of a second base station and a time difference between an uplink receiving time point of the first base station and an uplink receiving time point of the second base station is taken as an example. Referring to FIG. 8, this embodiment includes the following contents.

81: A first base station sends an instruction message to a UE, where the instruction message is used to trigger the UE to perform synchronization information measurement.

82: After receiving the instruction message sent by the first base station, the UE measures a synchronous signal in a cell controlled by the first base station, and obtains a receiving time point $\tilde{T}_D^{unsyn}$ at which the UE receives a downlink frame sent by the first base station.

83: The UE starts a PRACH process in the cell controlled by the first base station, and obtains an uplink sending time point $T_a^{unsyn}$ in the cell controlled by the first base station and a propagation delay $T_{STD}^{unsyn}$ between the UE and the first base station.

84: The UE determines whether to hand over from a cell controlled by a second base station to the cell controlled by the first base station. If yes, directly perform 87; otherwise, perform 85.

For example, the UE may store historical information; and the UE may determine, according to the stored historical information, whether to hand over from the cell controlled by the second base station.

85: The UE measures a synchronous signal in the cell controlled by the second base station, and obtains a receiving time point $\tilde{T}_D^{base}$ at which the UE receives a downlink frame sent by the second base station.

86: The UE starts a PRACH process in the cell controlled by the second base station, and obtains an uplink sending time point $T_a^{unsyn}$ in the cell controlled by the second base station and a propagation delay $T_{STD}^{base}$ between the UE and the second base station.

87: The UE obtains a time difference $t_u$ between an uplink receiving time point $T_U^{unsyn}$ of the first base station and an uplink receiving time point $T_U^{base}$ of the second base station and a time difference $t_d$ between a downlink sending time point $T_D^{unsyn}$ of the first base station and a downlink sending time point $T_D^{base}$ of the second base station;

where, $T_U^{unsyn}=T_a^{unsyn}+T_{STD}^{unsyn}$; and $T_D^{unsyn}=\tilde{T}_D^{unsyn}-T_{STD}^{unsyn}$.

In a specific implementation process, if the UE hands over from the cell controlled by the second base station to the cell controlled by the first base station, the UE may directly obtain the uplink receiving time point $T_U^{base}$ and the downlink sending time point $T_D^{base}$ of the second base station from the historical information. If the UE does not hand over from the cell controlled by the second base station to the cell controlled by the first base station, $T_U^{base}$ and $T_D^{base}$ are calculated according to the following formulas: $T_U^{base}=T_a^{base}+T_{STD}^{base}$; and $T_D^{base}=\tilde{T}_D^{base}-T_{STD}^{base}$.

Then, according to $T_U^{unsyn}$, $T_D^{unsyn}$, $T_U^{base}$, and $T_D^{base}$, the time differences $t_u$ and $t_d$ are calculated according to the following formulas: $t_u=T_U^{unsyn}-T_U^{base}$; $t_d=T_D^{unsyn}-T_D^{base}$.

88: The UE sends the time differences $t_u$ and $t_d$ to the first base station; where the UE may send the synchronization information (which specifically is the time differences $t_u$ and $t_d$), in an event-triggering manner or in a periodic-triggering manner, that is, it may be that after the UE obtains the synchronization information by being triggered by the instruction message, the UE reports the synchronization information to the first base station; and it may also be that the instruction message carries a period value, the UE periodically reports the synchronization information according to the period value, for example, the period value is x, the UE reports the synchronization information with x as a period.

89: After receiving the time differences $t_u$ and $t_d$ sent by the UE, the first base station adjusts the uplink receiving time point and the downlink sending time point of the first base station according to the time differences, so as to keep consistency between the uplink receiving time point of the first base station and the uplink receiving time point of the second base station and keep consistency between the downlink sending time point of the first base station and the downlink sending time point of the second base station, that is:

the uplink receiving time point of the first base station after the adjustment=the uplink receiving time point of the first base station before the adjustment$-t_u$;

the downlink sending time point of the first base station after the adjustment=the downlink sending time point of the first base station before the adjustment$-t_d$;

In this embodiment, a base station that needs to adjust synchronization time adjusts a downlink sending time point and an uplink receiving time point of the base station according to a time difference reported by a UE served by the base station, so as to keep consistency between time points after the adjustment and a downlink sending time point and an uplink receiving time point of a base station that serves as a synchronization time reference, thereby achieving synchronization between the base stations. Furthermore, in this embodiment, it does not need to assume coverage of the base station that needs to adjust synchronization time as a point, therefore, an applicable range is large and is not limited to synchronization between a low-power base station that needs to adjust synchronization time and a high-power base station that serves as a synchronization time reference.

FIG. 7 shows adjustment performed according to the uplink receiving time point and the downlink sending time point of the second base station; and FIG. 8 shows adjustment performed according to the time difference between the uplink receiving time point of the first base station and the uplink receiving time point of the second base station and the time difference between the downlink sending time point of the first base station and the downlink sending time point of the second base station. Optionally, if the uplink receiving time point and the downlink sending time point of the second base station are the same, adjustment may be performed according to the uplink receiving time point or the downlink sending time point of the second base station; or adjustment may be performed according to the time difference between the uplink receiving time point of the first base station and the uplink receiving time point of the second base station or the time difference between the downlink sending time point of the first base station and the downlink sending time point of the second base station. In this way, the amount of reported information may be decreased and an overhead may be reduced. Reported synchronization information may include only the uplink receiving time point or the downlink sending time point of the second base station; or reported synchronization information may include only the time difference between the uplink receiving time point of the first base station and the uplink receiving time point of the second base station or the time difference between the downlink sending time point of the first base station and the downlink sending time point of the second base station.

Figure 9:
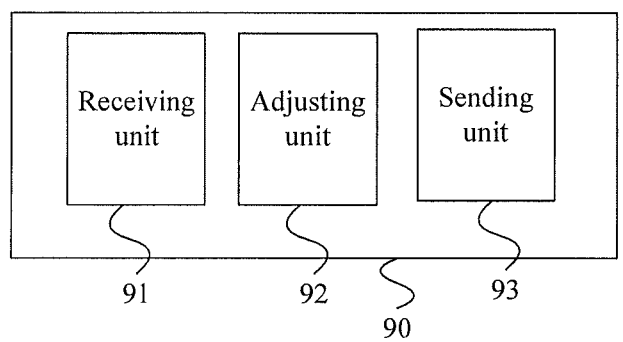
FIG. 9 is a schematic structural diagram of a base station according to an embodiment of the present invention.

FIG. 9 is a schematic structural diagram of a base station according to an embodiment of the present invention. A base station 90 provided in this embodiment may be configured to implement the method for synchronization between base stations provided in the foregoing embodiments. The base station 90 is a first base station that needs to adjust synchronization time, and the base station 90 includes a receiving unit 91 and an adjusting unit 92. The receiving unit 91 is configured to receive synchronization information sent by a user equipment; and the adjusting unit 92 is configured to adjust a downlink sending time point and an uplink receiving time point of the first base station according to the synchronization information, so as to keep consistency between the downlink sending time point of the first base station and a downlink sending time point of a second base station that serves as a synchronization time reference and keep consistency between the uplink receiving time point of the first base station and an uplink receiving time point of the second base station.

Optionally, the synchronization information includes the downlink sending time point and/or the uplink receiving time point of the second base station. The adjusting unit 92 is specifically configured to: when the downlink sending time point and the uplink receiving time point of the second base station are different and the synchronization information received by the receiving unit 91 includes the downlink sending time point and the uplink receiving time point of the second base station, adjust, according to the downlink sending time point of the second base station, the downlink sending time point of the first base station to be consistent with the downlink sending time point of the second base station; and adjust, according to the uplink receiving time point of the second base station, the uplink receiving time point of the first base station to be consistent with the uplink receiving time point of the second base station. Alternatively, the adjusting unit 92 is specifically configured to: when the downlink sending time point and the uplink receiving time point of the second base station are the same and the synchronization information received by the receiving unit 91 includes the downlink sending time point or the uplink receiving time point of the second base station, adjust, according to the downlink sending time point or the uplink receiving time point of the second base station, the downlink sending time point and the uplink receiving time point of the first base station to be consistent with the downlink sending time point or the uplink receiving time point of the second base station.

Optionally, the synchronization information includes a time difference between the downlink sending time point of the first base station and the downlink sending time point of the second base station, and/or a time difference between the uplink receiving time point of the first base station and the uplink receiving time point of the second base station. The adjusting unit 92 is specifically configured to: when the synchronization information received by the receiving unit 91 includes the time difference between the downlink sending time point of the first base station and the downlink sending time point of the second base station and the time difference between the uplink receiving time point of the first base station and the uplink receiving time point of the second base station, adjust, according to the time difference between the downlink sending time point of the first base station and the downlink sending time point of the second base station, the downlink sending time point of the first base station to be consistent with the downlink sending time point of the second base station; and adjust, according to the time difference between the uplink receiving time point of the first base station and the uplink receiving time point of the second base station, the uplink receiving time point of the first base station to be consistent with the uplink receiving time point of the second base station. Alternatively, the adjusting unit 92 is specifically configured to: when the downlink sending time point and the uplink receiving time point of the second base station are the same and the synchronization information received by the receiving unit 91 includes the time difference between the downlink sending time point of the first base station and the downlink sending time point of the second base station or the time difference between the uplink receiving time point of the first base station and the uplink receiving time point of the second base station, according to the time difference between the downlink sending time point of the first base station and the downlink sending time point of the second base station or the time difference between the uplink receiving time point of the first base station and the uplink receiving time point of the second base station, adjust the downlink sending time point of the first base station to be consistent with the downlink sending time point of the second base station and adjust the uplink receiving time point of the first base station to be consistent with the uplink receiving time point of the second base station.

Optionally, the first base station 90 further includes: a sending unit 93, configured to send an instruction message to the user equipment, where the instruction message is used to instruct the user equipment to report the synchronization information after receiving the instruction message; or the instruction message carries a period value, and the instruction message is used to instruct the user equipment to periodically report the synchronization information according to the period value.

In this embodiment, a base station that needs to adjust synchronization time adjusts a downlink sending time point and an uplink receiving time point of the base station according to synchronization information reported by a UE served by the base station, so as to keep consistency between time points after the adjustment and a downlink sending time point and an uplink receiving time point of a base station that serves as a synchronization time reference, thereby achieving synchronization between the base stations. Furthermore, in this embodiment, it does not need to assume coverage of the base station that needs to adjust synchronization time as a point. Therefore, an applicable range is large and is not limited to synchronization between a low-power base station that needs to adjust synchronization time and a high-power base station that serves as a synchronization time reference.

Figure 10:
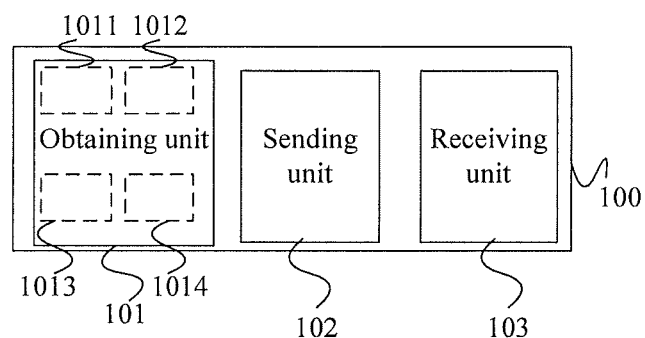
FIG. 10 is a schematic structural diagram of a user equipment according to an embodiment of the present invention.

FIG. 10 is a schematic structural diagram of a user equipment according to an embodiment of the present invention. A user equipment 100 provided in this embodiment may be configured to implement the method for synchronization between base stations provided in the foregoing embodiments. As shown in FIG. 10, the user equipment 100 includes an obtaining unit 101 and a sending unit 102. The obtaining unit 101 is configured to obtain synchronization information; and the sending unit 102 is configured to send the synchronization information to a serving base station of the user equipment 100, where the synchronization information is used for the serving base station to adjust a downlink sending time point and an uplink receiving time point of the serving base station, so as to keep consistency between the downlink sending time point of the serving base station and a downlink sending time point of a second base station that serves as a synchronization time reference and keep consistency between the uplink receiving time point of the serving base station and an uplink receiving time point of the second base station.

Optionally, the synchronization information includes the downlink sending time point and/or the uplink receiving time point of the second base station. The obtaining unit 101 is specifically configured to obtain the downlink sending time point and/or the uplink receiving time point of the second base station. The obtaining unit 101 includes: a first obtaining sub-unit 1011, configured to obtain the downlink sending time point of the second base station according to a time point at which the user equipment 100 receives a downlink frame sent by the second base station and a propagation delay between the user equipment 100 and the second base station; and/or a second obtaining sub-unit 1012, configured to obtain the uplink receiving time point of the second base station according to a time point at which the user equipment 100 sends an uplink frame to the second base station and the propagation delay between the user equipment 100 and the second base station.

Optionally, the synchronization information includes a time difference between the downlink sending time point of the first base station and the downlink sending time point of the second base station, and/or a time difference between the uplink receiving time point of the first base station and the uplink receiving time point of the second base station. The obtaining unit 101 is specifically configured to obtain the time difference between the downlink sending time point of the first base station and the downlink sending time point of the second base station, and/or the time difference between the uplink receiving time point of the first base station and the uplink receiving time point of the second base station. The obtaining unit 101 includes: a third obtaining sub-unit 1013, configured to obtain the downlink sending time point of the first base station according to a time point at which the user equipment 100 receives a downlink frame sent by the first base station and a propagation delay between the user equipment 100 and the first base station, obtain the downlink sending time point of the second base station according to a time point at which a downlink frame sent by the second base station is received and a propagation delay between the user equipment 100 and the second base station, and obtain the time difference between the downlink sending time point of the first base station and the downlink sending time point of the second base station according to the downlink sending time point of the first base station and the downlink sending time point of the second base station; and/or an obtaining sub-unit 1014, configured to obtain the uplink receiving time point of the first base station according to a time point at which the user equipment 100 sends an uplink frame to the first base station and the propagation delay between the user equipment 100 and the first base station, obtain the uplink receiving time point of the second base station according to a time point at which the user equipment 100 sends an uplink frame to the second base station and the propagation delay between the user equipment 100 and the second base station, and obtain the time difference between the uplink receiving time point of the first base station and the uplink receiving time point of the second base station according to the uplink receiving time point of the first base station and the uplink receiving time point of the second base station.

Optionally, the user equipment 100 further includes: a receiving unit 103, configured to receive an instruction message sent by the first base station, where the instruction message is used to instruct the user equipment 100 to send the synchronization information after receiving the instruction message; or, the instruction message carries a period value, and the instruction message is used to instruct the user equipment 100 to periodically send the synchronization information according to the period value.

In this embodiment, a base station that needs to adjust synchronization time adjusts a downlink sending time point and an uplink receiving time point according to synchronization information reported by a UE served by the base station, so as to keep consistency between time points after the adjustment and a downlink sending time point and an uplink receiving time point of a base station that serves as a synchronization time reference, thereby achieving synchronization between the base stations. Furthermore, in this embodiment, it does not need to assume coverage of the base station that needs to adjust synchronization time as a point. Therefore, an applicable range is large and is not limited to synchronization between a low-power base station that needs to adjust synchronization time and a high-power base station that serves as a synchronization time reference.

Figure 11:
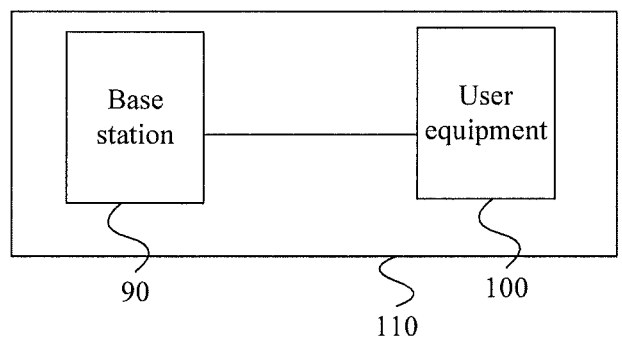
FIG. 11 is a schematic structural diagram of a communication system according to an embodiment of the present invention.

FIG. 11 is a schematic structural diagram of a communication system according to an embodiment of the present invention. The communication system 110 includes the base station 90 shown in FIG. 9 and the user equipment 100 shown in FIG. 10. For structures and functions of the base station 90 and the user equipment 100 in the communication system 110, reference is made to the foregoing embodiments, which are not described herein again.

It may be understood that the "first" and "second" in the foregoing embodiments are used to distinguish different base stations and do not impose a limitation on base stations.

Persons of ordinary skill in the art may understand that all or a part of the steps of the foregoing method embodiments may be implemented by a program instructing relevant hardware. The foregoing program may be stored in a computer readable storage medium. When the program is run, the steps of the foregoing method embodiments are performed. The foregoing storage medium may include a ROM, a RAM, a magnetic disk, an optical disk, or the like.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features of the technical solutions, as long as these modifications and replacements do not make the essence of corresponding technical solutions depart from the spirit and scope of the technical solutions in the embodiments of the present invention.

What is claimed is:

1. A method for synchronization between base stations, comprising:

sending, by a first base station of the base stations, an instruction message to a user equipment, wherein the instruction message is used to instruct the user equipment to report synchronization information after receiving the instruction message; or, the instruction message carries a period value, and the instruction message is used to instruct the user equipment to periodically report the synchronization information according to the period value;

receiving, by the first base station, the synchronization information sent by the user equipment, wherein the first base station is a serving base station of the user equipment, and wherein the synchronization information comprising:

a downlink sending time point of a second base station of the base stations and an uplink receiving time point of the second base station; or a time difference between a downlink sending time point of the first base station and the downlink sending time point of the second base station, or a time difference between an uplink receiving time point of the first base station and the uplink receiving time point of the second base station; and adjusting, by the first base station, the downlink sending time point and the uplink receiving time point of the first base station according to the synchronization information, so as to keep consistency between the downlink sending time point of the first base station and the downlink sending time point of the second base station and keep consistency between the uplink receiving time point of the first base station and the uplink receiving time point of the second base station, wherein the second base station serves as a synchronization time reference for the first base station, wherein, when the synchronization information comprises the downlink sending time point of a second base station of the base stations and the uplink receiving time point of the second base station, the adjusting comprises:

when the downlink sending time point of the second base station and the uplink receiving time point of the second base station are different and the synchronization information comprises the downlink sending time point and the uplink receiving time point of the second base station, adjusting, by the first base station, according to the downlink sending time point of the second base station, the downlink sending time point of the first base station to be consistent with the downlink sending time point of the second base station, and adjusting, by the first base station, according to the uplink receiving time point of the second base station, the uplink receiving time point of the first base station to be consistent with the uplink receiving time point of the second base station; or when the downlink sending time point of the second base station and the uplink receiving time point of the second base station are the same and the synchronization information comprises the downlink sending time point of the second base station or the uplink receiving timepoint of the second base station, adjusting, by the first base station, according to the downlink sending time point of the second base station or the uplink receiving time point of the second base station, the downlink sending time point of the first base station and the uplink receiving time point of the first base station to be consistent with the downlink sending time point of the second base station or the uplink receiving time point of the second base station.

2. The method according to claim 1, wherein the adjusting, by the first base station, the downlink sending time point and the uplink receiving time point of the first base station according to the synchronization information comprises:

when the synchronization information comprises the time difference between the downlink sending time point of the first base station and the downlink sending time point of the second base station and the time difference between the uplink receiving time point of the first base station and the uplink receiving time point of the second base station, adjusting, by the first base station, according to the time difference between the downlink sending time point of the first base station and the downlink sending time point of the second base station, the downlink sending time point of the first base station to be consistent with the downlink sending time point of the second base station, and adjusting, by the first base station, according to the time difference between the uplink receiving time point of the first base station and the uplink receiving time point of the second base station, the uplink receiving time point of the first base station to be consistent with the uplink receiving time point of the second base station; or when the downlink sending time point of the second base station and the uplink receiving time point of the second base station are the same and the synchronization information comprises the time difference between the downlink sending time point of the first base station and the downlink sending time point of the second base station or the time difference between the uplink receiving time point of the first base station and the uplink receiving time point of the second base station, adjusting, by the first base station, according to the time difference between the downlink sending time point of the first base station and the downlink sending time point of the second base station or the time difference between the uplink receiving time point of the first base station and the uplink receiving time point of the second base station, the downlink sending time point of the first base station to be consistent with the downlink sending time point of the second base station and the uplink receiving time point of the first base station to be consistent with the uplink receiving time point of the second base station.

3. The method according to claim 1, further comprising:
determining whether to hand over from a cell controlled by the second base station to a cell controlled by the first base station; and
obtaining, if it is determined not to hand over, a receiving time point at which the UE receives a downlink frame sent by the second base station, an uplink sending time point in the cell controlled by the second base station, and a propagation delay between the UE and the second base station.

4. The method according to claim 3, further comprising obtaining, prior to the determining whether to hand over, a receiving time point at which the UE receives a downlink frame sent by the first base station, an uplink sending time point in the cell controlled by the first base station, and a propagation delay between the UE and the first base station.

5. A method for synchronization between base stations, comprising:
receiving, by a user equipment, an instruction message sent by a first base station of the base stations, wherein the instruction message is used to instruct the user equipment to send a synchronization information after receiving the instruction message; or, the instruction message carries a period value, and the instruction message is used to instruct the user equipment to periodically send the synchronization information according to the period value;

obtaining, by the user equipment, the synchronization information, comprising:
  obtaining, by the user equipment, a downlink sending time point of a second base station and an uplink receiving time point of the second base station; or
  obtaining, by the user equipment, a time difference between a downlink sending time point of the first base station and the downlink sending time point of the second base station, or a time difference between an uplink receiving time point of the first base station and the uplink receiving time point of the second base station; and
sending, by the user equipment, the synchronization information to the first base station, wherein the first base station is a serving base station of the user equipment, and the synchronization information is used for the first base station to adjust the downlink sending time point of the first base station and the uplink receiving time point of the first base station, so as to keep consistency between the downlink sending time point of the first base station and the downlink sending time point of a second base station and keep consistency between the uplink receiving time point of the first base station and the uplink receiving time point of the second base station, wherein the second base station serves as a synchronization time reference for the first base station, wherein, when the synchronization information comprises the downlink sending time point of a second base station of the base stations and the uplink receiving time point of the second base station, the adjusting by the first base station comprises:
  when the downlink sending time point of the second base station and the uplink receiving time point of the second base station are different and the synchronization information comprises the downlink sending time point and the uplink receiving time point of the second base station, adjusting, by the first base station, according to the downlink sending time point of the second base station, the downlink sending time point of the first base station to be consistent with the downlink sending time point of the second base station, and adjusting, by the first base station, according to the uplink receiving time point of the second base station, the uplink receiving time point of the first base station to be consistent with the uplink receiving time point of the second base station; or
  when the downlink sending time point of the second base station and the uplink receiving time point of the second base station are the same and the synchronization information comprises the downlink sending time point of the second base station or the uplink receiving time point of the second base station, adjusting, by the first base station, according to the downlink sending time point of the second base station or the uplink receiving time point of the second base station, the downlink sending time point of the first base station and the uplink receiving time point of the first base station to be consistent with the downlink sending time point of the second base station or the uplink receiving time point of the second base station.

6. The method according to claim 5, wherein:
the obtaining, by the user equipment, the downlink sending time point of the second base station comprises: obtaining, by the user equipment, the downlink sending time point of the second base station according to a time point at which the user equipment receives a downlink frame sent by the second base station and a propagation delay between the user equipment and the second base station; and
the obtaining, by the user equipment, the uplink receiving time point of the second base station comprises: obtaining, by the user equipment, the uplink receiving time point of the second base station according to a time point at which the user equipment sends an uplink frame to the second base station and the propagation delay between the user equipment and the second base station.

7. The method according to claim 5, wherein:
the obtaining, by the user equipment, the time difference between the downlink sending time point of the first base station and the downlink sending time point of the second base station comprises: obtaining, by the user equipment, the downlink sending time point of the first base station according to a time point at which the user equipment receives a downlink frame sent by the first base station and a propagation delay between the user equipment and the first base station, obtaining, by the user equipment, the downlink sending time point of the second base station according to a time point at which the user equipment receives a downlink frame sent by the second base station and a propagation delay between the user equipment and the second base station, and obtaining, by the user equipment, the time difference between the downlink sending time point of the first base station and the downlink sending time point of the second base station according to the downlink sending time point of the first base station and the downlink sending time point of the second base station; and
the obtaining, by the user equipment, the time difference between the uplink receiving time point of the first base station and the uplink receiving time point of the second base station comprises: obtaining, by the user equipment, the uplink receiving time point of the first base station according to a time point at which the user equipment sends an uplink frame to the first base station and the propagation delay between the user equipment and the first base station, obtaining, by the user equipment, the uplink receiving time point of the second base station according to a time point at which the user equipment sends an uplink frame to the second base station and the propagation delay between the user equipment and the second base station; and obtaining, by the user equipment, the time difference between the uplink receiving time point of the first base station and the uplink receiving time point of the second base station according to the uplink receiving time point of the first base station and the uplink receiving time point of the second base station.

8. A base station, wherein the base station serves as a first base station and is a serving base station of a user equipment, and the base station further comprises:
  a transmitter, configured to send an instruction message to the user equipment, wherein
    the instruction message is used to instruct the user equipment to report synchronization information after receiving the instruction message; or,
    the instruction message carries a period value, and the instruction message is used to instruct the user equipment to periodically report the synchronization information according to the period value, and wherein:

the synchronization information comprises a downlink sending time point of a second base station and an uplink receiving time point of the second base station, or the synchronization information comprises a time difference between a downlink sending time point of the first base station and the downlink sending time point of the second base station, or a time difference between an uplink receiving time point of the first base station and the uplink receiving time point of the second base station;

a receiver, configured to receive synchronization information sent by the user equipment; and a processor, configured to adjust the downlink sending time point of the first base station and the uplink receiving time point of the first base station according to the synchronization information received by the receive, so as to keep consistency between the downlink sending time point of the first base station and the downlink sending time point of a second base station and keep consistency between the uplink receiving time point of the first base station and the uplink receiving time point of the second base station, wherein:

the second base station serves as a time synchronization reference for the first base station, and when the synchronization information comprises the downlink sending time point of the second base station and the uplink receiving time point of the second base station, the processor is configured to:

when the downlink sending time point of the second base station and the uplink receiving time point of the second base station are different and the synchronization information comprises the downlink sending time point of the second base station and the uplink receiving time point of the second base station, adjust, according to the downlink sending time point of the second base station, the downlink sending time point of the first base station to be consistent with the downlink sending time point of the second base station, and adjust, according to the uplink receiving time point of the second base station, the uplink receiving time point of the first base station to be consistent with the uplink receiving time point of the second base station; or when the downlink sending time point of the second base station and the uplink receiving time point of the second base station are the same and the synchronization information comprises the downlink sending time point of the second base station or the uplink receiving time point of the second base station, adjust, according to the downlink sending time point of the second base station or the uplink receiving time point of the second base station, the downlink sending time point of the first base station and the uplink receiving time point of the first base station to be consistent with the downlink sending time point of the second base station or the uplink receiving time point of the second base station.

9. The base station according to claim 8, wherein the processor is configured to: when the synchronization information comprises the time difference between the downlink sending time point of the first base station and the downlink sending time point of the second base station and the time difference between the uplink receiving time point of the first base station and the uplink receiving time point of the second base station, adjust, according to the time difference between the downlink sending time point of the first base station and the downlink sending time point of the second base station, the downlink sending time point of the first base station to be consistent with the downlink sending time point of the second base station, and adjust, according to the time difference between the uplink receiving time point of the first base station and the uplink receiving time point of the second base station, the uplink receiving time point of the first base station to be consistent with the uplink receiving time point of the second base station; or the processor is configured to: when the downlink sending time point of the second base station and the uplink receiving time point of the second base station are the same and the synchronization information comprises the time difference between the downlink sending time point of the first base station and the downlink sending time point of the second base station or the time difference between the uplink receiving time point of the first base station and the uplink receiving time point of the second base station, adjust, according to the time difference between the downlink sending time point of the first base station and the downlink sending time point of the second base station or the time difference between the uplink receiving time point of the first base station and the uplink receiving time point of the second base station, the downlink sending time point of the first base station to be consistent with the downlink sending time point of the second base station and the uplink receiving time point of the first base station to be consistent with the uplink receiving time point of the second base station.

10. A user equipment, comprising:

a receiver, configured to receive an instruction message sent by a first base station configured as a serving base station of the user equipment, wherein the instruction message is used to instruct the user equipment to send a synchronization information after receiving the instruction message; or, the instruction message carries a period value, and the instruction message is used to instruct the user equipment to periodically send the synchronization information according to the period value, and wherein the synchronization information comprises a downlink sending time point of a second base station and an uplink receiving time point of the second base station, or the synchronization information comprises a time difference between a downlink sending time point of the first base station and the downlink sending time point of the second base station, or a time difference between an uplink receiving time point of the first base station and the uplink receiving time point of the second base station;

a processor, configured to obtain the synchronization information; and a transmitter, configured to send the synchronization information obtained by the processor to the serving base station of the user equipment, wherein the synchronization information is used for the serving base station to adjust the downlink sending time point of the serving base station and an uplink receiving time point of the serving base station, so as to keep consistency between the downlink sending time point of the serving base station and a downlink sending time point of the second base station and keep consistency between the uplink receiving time point of the serving base station and the uplink receiving time point of the second base station, wherein the second base station serves as a synchronization time reference for the first base station, wherein when the synchronization information comprises the downlink sending time point of the second base station and the uplink receiving time point of the second base station the adjusting by the serving base station comprises:

when the downlink sending time point of the second base station and the uplink receiving time point of the second base station are different and the synchronization information comprises the downlink sending time point of the second base station and the uplink receiving time point of the second base station, adjust, according to the downlink sending time point of the second base station, the downlink sending time point of the first base station to be consistent with the downlink sending time point of the second base station, and adjust, according to the uplink receiving time point of the second base station, the uplink receiving time point of the first base station to be consistent with the uplink receiving time point of the second base station; or when the downlink sending time point of the second base station and the uplink receiving time point of the second base station are the same and the synchronization information comprises the downlink sending time point of the second base station or the uplink receiving time point of the second base station, adjust, according to the downlink sending time point of the second base station or the uplink receiving time point of the second base station, the downlink sending time point of the first base station and the uplink receiving time point of the first base station to be consistent with the downlink sending time point of the second base station or the uplink receiving time point of the second base station.

11. The user equipment according to claim 10, wherein: the processor is configured to obtain the downlink sending time point of the second base station and the uplink receiving time point of the second base station.

12. The user equipment according to claim 11, wherein the processor is further configured to obtain at least one of:

the downlink sending time point of the second base station according to a time point at which the user equipment receives a downlink frame sent by the second base station plus a propagation delay between the user equipment and the second base station; and the uplink receiving time point of the second base station according to a time point at which the user equipment sends an uplink frame to the second base station plus the propagation delay between the user equipment and the second base station.

13. The user equipment according to claim 10, wherein:

the processor is configured to obtain the time difference between the downlink sending time point of the first base station and the downlink sending time point of the second base station, or the time difference between the uplink receiving time point of the first base station and the uplink receiving time point of the second base station.

14. The user equipment according to claim 13, wherein the processor is further configured to obtain at least one of:

the downlink sending time point of the first base station according to a time point at which the user equipment receives a downlink frame sent by the first base station and a propagation delay between the user equipment and the first base station, obtain the downlink sending time point of the second base station according to a time point at which a downlink frame sent by the second base station is received and a propagation delay between the user equipment and the second base station, and obtain the time difference between the downlink sending time point of the first base station and the downlink sending time point of the second base station according to the downlink sending time point of the first base station and the downlink sending time point of the second base station; and the uplink receiving time point of the first base station according to a time point at which the user equipment sends an uplink frame to the first base station and the propagation delay between the user equipment and the first base station, obtain the uplink receiving time point of the second base station according to a time point at which the user equipment sends an uplink frame to the second base station and the propagation delay between the user equipment and the second base station, and obtain the time difference between the uplink receiving time point of the first base station and the uplink receiving time point of the second base station according to the uplink receiving time point of the first base station and the uplink receiving time point of the second base station.

* * * * *